United States Patent [19]

Bostick, Jr.

[11] Patent Number: 4,591,791
[45] Date of Patent: May 27, 1986

[54] ELECTROMAGNETIC ARRAY PROFILING SURVEY METHOD

[75] Inventor: Francis X. Bostick, Jr., Austin, Tex.

[73] Assignee: Board of Regents, University of Texas System, Austin, Tex.

[21] Appl. No.: 636,232

[22] Filed: Jul. 31, 1984

[51] Int. Cl.$^4$ .............................................. G01V 3/08
[52] U.S. Cl. ................................................... 324/350
[58] Field of Search ........................................... 324/350

[56] References Cited

U.S. PATENT DOCUMENTS

| | | | |
|---|---|---|---|
| 2,667,801 | 5/1954 | Cagniard | 324/1 |
| 3,188,558 | 6/1965 | Yungul | 324/1 |
| 3,986,207 | 10/1976 | Gerbel et al. | 360/6 |
| 4,095,169 | 6/1978 | Muse | 324/8 |
| 4,210,869 | 7/1980 | Groenendyke et al. | 324/349 |
| 4,286,218 | 8/1981 | Bloomquist et al. | 324/350 |
| 4,349,781 | 9/1982 | Vozoff | 324/346 |
| 4,449,099 | 5/1984 | Hoehn | 324/350 |

OTHER PUBLICATIONS

Article—"Telluric Sounding—A Magnetotelluric Method Without Magnetic Measurements" by Yungul, Geophysics, vol. XXXI, No. 1 (Feb. 1966).

Article—"Magnetotelluries with a Remote Magnetic Reference" by Gamble et al., Geophysics, vol. 44, No. 1 (Jan. 1979).

Primary Examiner—Gerard R. Strecker
Attorney, Agent, or Firm—Arnold, White & Durkee

[57] ABSTRACT

An electromagnetic survey method for geophysical exploration, in which the variations in the earth's magnetic field are measured in two, non-parallel directions at one point in the survey area. Simultaneously, the variations in the earth's electrical field parallel to the survey line are measured at a number of points along the survey line. These measured variations are transformed to the frequency domain, and then the horizontal component of the magnetic field orthogonal to the direction of the measured electrical field is calculated. The impedance at each measurement point on the survey line is calculated as a function of frequency, and weighted averages of the impedances for predetermined frequencies using a zero phase length weight function corresponding to a low pass filter are used to calculate the subsurface conductivity distribution.

9 Claims, 1 Drawing Figure

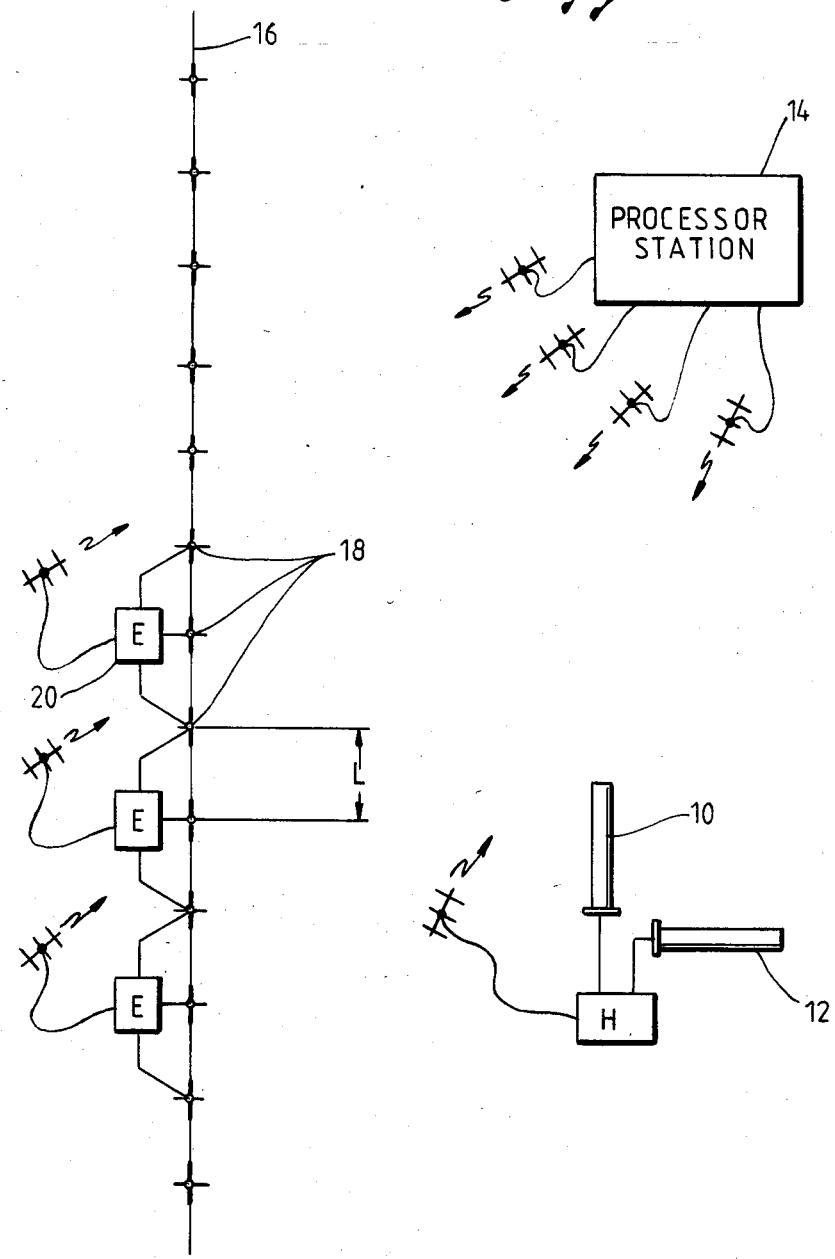

ELECTROMAGNETIC ARRAY PROFILING SURVEY METHOD

BACKGROUND OF THE INVENTION

This invention relates to the field of geophysical exploration using measurements of naturally occurring or artificially induced geomagnetic fields and induced geoelectric (telluric) fields, collectively called magnetotelluric fields.

The flow of the telluric currents through the earth's crust depends upon the conductivity or resistivity of the structure of the crust at any particular point. If this conductivity or resistivity can be measured and mapped, information about the structure, and in particular as it may relate to the presence of hydrocarbon, mineral or geothermal resources, can be gained. This is particularly useful in areas where seismic methods of geophysical surveying cannot be used, such as where the sedimentary rocks are overlaid with a thick volcanic layer.

The telluric currents constantly vary in magnitude, direction and polarity, and constitute a complex spectrum of components with various frequencies.

The first practicable electromagnetic survey method was described by Cagniard in U.S. Pat. No. 2,677,810. This consists of measuring and recording over a period of time the variations in one horizontal component of the telluric field, and simultaneously measuring the recording the orthogonal component of the geomagnetic field. These measurements are then converted into frequency components by means of Fourier analysis. The ratio of the frequency component of the electrical field to that of the magnetic field is a wave impedance that is a function of frequency. Since the depth of penetration of an electromagnetic wave into the earth is inversely related to the frequency of the wave and the conductivity of the earth, the wave impedance can be used to estimate the conductivity distribution in a vertical direction through the earth's surface. Cagniard made this estimate using a mathematical model in which conductivity varied only with depth, the so-called 1-D model.

This method was subsequently developed by other workers to be used with models in which the conductivity varies with one horizontal coordinate as well as with depth, the 2-D model. The coordinate along which conductivity is constant in this model is called "strike". In this model there are two cases to be considered, based on the polarization of the magnetotelluric fields. In these two cases the electric fields are polarized respectively parallel and perpendicular to strike. Theoretical studies show that the E parallel impedance function can be used with the techniques developed for 1-D to give reasonably accurate estimates of the conductivity directly beneath the site at which the function is computed. However, the E perpendicular impedance functions have very different properties, and cannot be directly inverted to produce an estimate of conductivity which is of reasonable accuracy. The most common solution of this problem is to use the curves obtained at more than one site, and to adjust the conductivity distribution in the model by an iterative process until theoretical E perpendicular curves which best fit the observed results are obtained. This method has many drawbacks, in particular it requires a considerable amount of computational effort, and there is no assurance that the solution obtained is in fact the correct one.

These methods work well when the area being surveyed does have conductivity which varies only in one or two directions. Unfortunately, however, such two-dimensional variation is rare. When magnetotelluric measurements are made over a structure having a three dimensional conductivity distribution, the following problems are encountered. First, it is generally not possible to identify a set of principal axes as it is in the 2-D case, although a number of ad hoc procedures exist to generate a set of axes. Second, whatever coordinate system is used, it is not possible to separate the electric field into the two distinct cases with the distinctive properties of E parallel and E perpendicular found in the 2-D case. The desirable properties of the E parallel case disappear first, and both cases take on properties similar to those of E perpendicular. Various ad hoc procedures were developed to try and deal with this problem, but they have had limited success. A third problem is that the considerable additional complexity significantly increases the difficulty of ensuring that the interpretation of the data obtained is in fact the correct one.

One way of reducing the third problem is to take many more measurements. In the classical magnetotelluric method, it is usually more difficult to measure the magnetic field than it is to measure the electrical field, making a large number of measurements time-consuming and expensive. However, it is an observed fact that the horizontal components of the magnetic field typically vary much more slowly over distance than do the horizontal components of the electric field. This gave rise to the magnetotelluric-telluric method, which involes the measurement of two orthogonal components of the magnetic field at a limited number of sites distributed over the survey area, and measurement of two orthogonal components of the electrical field at many more sites. The data are then processed using techniques similar to those described for the magnetotelluric model. However, when the conductivity distribution is three dimensional, the results are still found to be fairly unreliable. One variant of this method, which uses a method equivalent to the "roll-along" method of seismic geophysical exploration, is described in U.S. Pat. No. 4,286,218. Overlapping measurements of the electrical fields along the survey line improve the signal to noise ratio, and the magnetic field is measured at either end of the line, the intermediate magnetic field at the points at which the electrical field is measured being derived by interpolation.

The main disadvantage of all these conventional methods is that they give very unreliable results when the electrical and magnetic characteristics of the subsurface structure very in all three dimensions. Prior attempts to overcome this unreliability have involved huge computational efforst, which are rarely justified in terms of the results produced.

Another disadvantage of conventional magnetotelluric survey methods is that two measurements of the electrical field, preferably in orthogonal directions, are required at each survey point. This makes the use of this method particularly difficult in offshore surveying. An offshore method for a magnetotelluric survey is described in U.S. Pat. No. 4,210,869, but this method relies upon acoustic methods of measuring the position and orientation of the electrodes on the sea floor. The accuracy of these measurements is limited, making the interpretation of the survey results unreliable.

A further disadvantage of conventional magnetotelluric methods is that measurements of the magnetic field at several points in the survey area is required, unless the area to be surveyed is small. In addition, the vertical component must be ascertain at each E measurement point in order to distinguish between the apparent E parallel and E perpendicular components. As explained above, if this distinction is not made, there is a serious likelihood that errors will be made in interpreting the data obtained.

SUMMARY OF THE INVENTION

The above noted and other disadvantages of the prior art are overcome by providing an electromagnetic geophysical survey method which gives reliable results in the presence of three dimensional variation of the conductivity of the earth's structure at the survey points by means of relatively simple computational methods.

According to one aspect of the invention, the electromagnetic geophysical survey method comprises measuring the variations in the earth's magnetic field in at least two horizontal non-parallel directions at at least one point in the survey area and simultaneously with the measurement of the variations of the magnetic field, measuring the variations in the earth's electrical field parallel to a survey line at a plurality of points along the survey line. The measured data are then transformed into frequency components. The next steps are calculating as a function of frequency the horizontal compact of the earth's magnetic field orthogonal to the direction of the measured electrical field at each of the points from the measurements of the magnetic field in the two non-parallel directions, calculating as a function of frequency the impedance at each point, the impedance being the ratio between the measured electrical field at that point and the horizontal component of the earth's magnetic field orthogonal to the direction of the measured electrical field. Then, for predetermined frequencies, the weighted averages of the impedances are calculated such that the number of impedances entered into each weighted average increases with decreasing frequency in such a way that the number is substantially proportional to the effective depth of penetration into the earth of an electromagnetic wave of that frequency. Finally, the distribution of conductivity in the earth below the survey line is calculated as a function of depth from the weighted averages of the impedances.

In one embodiment, the two directions in which the earth's magnetic field is measured are orthogonal to one another.

In another embodiment, the step of measuring the variations in the earth's electrical field parallel to the survey line consists of measuring the variations in the potential differences between one or more pairs of electrodes in electrical contact with the earth and spaced at substantially equal distances along the survey line and dividing the measured potential differences by the distance between the electrodes.

In a further embodiment, the variations in the potential differences between all the electrodes are measured simultaneously.

In an alternative embodiment, the variations in the potential differences between the members of a group of adjacent electrodes consisting of less than all the electrodes are measured simultaneously and the measurements for each of the groups are made sequentially.

In another alternative embodiment, at least one of the electrodes in one group is also a member of the adjacent group.

In the preferred embodiment, the weighted averages of the impedances are calculated using a zero phase finite length weight function, the width of the weight function for each frequency being determined by selecting an appropriate width, obtaining a weighted average impedance using the selected function, using the weighted average so obtained to calculate an apparent depth of penetration, comparing the calculated depth of penetration to the expected depth of penetration, using the difference between the calculated and expected depths to assist in the selection of a more appropriate width, and repeating the process iteratively until a predetermined accuracy of calculation of the depth of penetration is obtained.

According to another aspect of the invention, the electromagnetic geophysical survey method consists of measuring the variations in the earth's magnetic field in at least two horizontal non-parallel directions at at least one point in the survey area, simultaneously with the measurement of the variation of the magnetic field, measuring the variations in the potential differences between adjacent electrodes in electrical contact with the earth, the electrodes being spaced at substantially equal intervals along a survey line and the measurements of the potential differences being made simultaneously and transforming the measured variations in the potential differences to a function of frequency. There is then calculated for predetermined frequencies the weighted averages of the measured potential differences such that the number of potential differences entered into each weighted average increases with decreasing frequency in such a way that the number is substantially proportional to the effective depth of penetration into the earth of an electromagnetic wave of that frequency. The horizontal component of the earth's magnetic field orthogonal to the direction of the survey line is calculated from the measurements of the magnetic field in the two non-parallel directions, the weighted impedances along the survey line are calculated from the ratio of the weighted averages of the potential differences and the horizontal orthogonal component of the magnetic field and the distribution of conductivity of the earth below the survey line is calculated as a function of depth from the weighted impedances.

According to yet another aspect of the invention, the electromagnetic geophysical survey method comprises additionally the steps of measuring the vertical component of the earth's magnetic field at a plurality of points along the survey line and using these measured vertical magnetic components together with the calculated distribution of conductivity of the earth below the survey line to determine the geophysical structure of the earth below the survey line.

It is an advantage of the invention that it provides a new and improved method of estimating the conductivity distribution of the earth's substructure below a survey line when that conductivity distribution varies in all three dimensions. Further advantages of the invention are to be found in the simplicity of the required placing of the electrical and magnetic field measuring devices in the survey method. A further advantage is that this invention requires simpler computational efforts to produce estimates of complex conductivity distributions than were required by prior methods.

The above, and other objects and advantages of the present invention will become more apparent from a detailed description of the preferred embodiments when read in conjunction with the drawings.

BRIEF DESCRIPTION OF THE DRAWINGS

FIG. 1 is a diagrammatic representation of the survey field.

DETAILED DESCRIPTION

The field layout for a survey in accordance with the present invention is shown in FIG. 1. A suitable site in the survey area for the magnetic field measurements is selected, preferably remote from localized non-natural sources of electromagnetic disturbance such as generators, high tension power lines, radio transmitters and busy raods. Magnetic field sensors 10 and 12, of a conventional type, are installed so as to measure the fluctuations of the horizontal component of the earth's magnetic field in two non-parallel directions. In the preferred embodiment, these sensors are at right angles to each other, with one sensor parallel to the proposed survey line. Readings from the magnetic field sensors 10 and 12 may be transmitted to a processor station 14 in real time by radio telemetry, as indicated in FIG. 1, or by direct cable transmission or over telephone lines.

In an alternative embodiment, the data is recorded in a storage medium such as an electronic computer memory, magnetic tape or disc resident at the recording site. The stored data could either be transmitted to the processor stations in delayed time or the storage medium containing the data could be physically transported to the processor station. This allows independent, unattended operation of the recording stations.

While a single magnetic measurement station is preferred as giving coherent reference signals, if circumstances demand more than one magnetic station location may be used. If it is necessary as the survey progresses to move the magnetic station, a second station with two sensors similarly aligned to the first is set up at the new position, and simultaneous measurements are made for a suitable period in order to translate data obtained using the second station to the same frame of reference as data obtained using the first station, a procedure familiar to those skilled in the art.

A survey line 16 is then determined. This line is preferably straight, but the method may also be used with curved survey lines. Electrodes 18 are installed in electrical contact with the earth along the survey line, preferably spaced equidistant from each other. Adjacent electrodes are connected by wires to a potential difference sensor 20. Readings from the potential difference sensors 20 are transmitted to the processor station 14 by radio, cable or telephone or they may be recorded on a mass storage medium at the recording site for subsequent transfer to the processor station, as in the case of the magnetic readings.

The E (electrical) field component is obtained by dividing the measured potential difference between two electrodes by the electrode spacing L. This type of E field measurement is in fact a weighted average of the E field component along the wire connecting the two electrodes. The arrangement therefore acts as a spatial low pass filter in wave number space, with an inherent weighting factor of a rectangle or boxcar function. The response of the sensor in wave number space is proportional to a sin (sinx/x) function with a cutoff wave number somewhat less than the reciprocal of L. Those skilled in the art will therefore be able to select a suitable value of L so as to provide the desired survey resolution.

A sequence of component E field measurements is made along the survey line 16. As shown in FIG. 1, the sensors are installed end to end. This arrangement spatially low pass filters the continuous E field component along the path of the survey, then samples this filtered component at the regular spatial interval L. This type of sampling is consistent with the requirements of the well-known Sampling Theorem necessary to prevent aliasing of the sampled data. The length of the spread of measurements on either side of the points of which it is desired to obtain conductivity data should be approximately equal to the maximum depth to be investigated. The E field measurements may be made simultaneously over the whole survey line or they may be made at one time over one group of adjacent electrodes and then at a later time over another group until the whole survey line has been covered in sequence. This latter method is advantageous when surveying to great depth so that the required spread of measurements is very long, and simultaneous measurements over the whole line would therefore be impracticable. When sequential measurements are made, a small overlap in the membership of adjacent groups may be used to provide redundancy to assist in the reduction of noise, but this slows down the survey so preferably it is only used when noise is a serious problem.

When the survey line 16 is curved the process must be modified. First, a low pass filter in the form of a weighted sum is applied to the impedances describing the relationships between the components of the electric field tangent to each of a group of adjacent path segments and the component of the magnetic field perpendicular to an effective direction defined for the group of segments. The simple cosine bell weighting function is also used for a curved survey line.

The effective direction of the line segments at a point $\alpha$ locating the center of the segment group is determined by defining the angle $\theta_o(\alpha)$ between the effective direction of the group and an arbitrary reference direction, say north. The defining relationship for the angle is $$\theta_o(\alpha) = \tan^{-1} \frac{\sum_{i=N_1(\alpha)}^{N_2(\alpha)} W_i(\alpha) \mathrm{SIN} \phi_i}{\sum_{i=N_1(\alpha)}^{N_2(\alpha)} W_i(\alpha) \mathrm{COS} \phi_i}$$

where the $W_i(\alpha)$ are the cosine bell weights, $N_1(\alpha)$ and $N_2(\alpha)$ are the lower and upper limits for the sum required to include all of the non-zero weights over the length of the cosine bell and the $\phi_i$ are the angles between the survey line segments and the reference direction.

The sum of the segment impedances weighted by the cosine bell is then used to compute an apparent depth of penetration. Also, an effective length, $L_E(\alpha)_1$ for the survey line segments in the vicinity of the point a is computed from the defining relation $$L_E(\alpha) = \frac{L}{W \max} \sum_{i=N_1(\alpha)}^{N_2(\alpha)} W_i(\alpha) \mathrm{COS}(\theta_o(\alpha) - \phi_i)$$

where L is the length of the individual path segments, all of which are assumed to be equal in length, and W max is the largest one of the $W_i$ weights included in the sum. For the case of the curved survey path the effective length, $L_E(\alpha)$, rather than the length of the cosine bell function, is required to be a specified multiple of the apparent depth of penetration.

The required value of $L_E(\alpha)$ is obtained by a process of iteration. The process begins by making an initial guess of a suitable length for the cosine bell function. The weights, $W_i(\alpha)$ are then computed and used to obtain the angle $\theta_o(\alpha)$ and the effective length $L_E(\alpha)$. The apparent depth of penetration is computed from the weighted sum of the segment impedances. The effective length and the depth of penetration are compared and the difference between the computed and specified multiple used to determine a new length for the cosine bell. The process is repeated in iterative fashion until a suitable measure of convergence is achieved. The procedure is used at each frequency and position on the survey line 16, to be examined.

In the preferred embodiment impedances which are the ratio of the frequency components of the E field measurement to those of the magnetic field measured simultaneously in the orthogonal direction to the E field are then calculated. This impedance designated Zxy is an element of a rank two impedance tensor relationship between the spatial components of the horizontal electric and magnetic fields. Zxy is defined by the equation $$Ex = ZxxHx + ZxyHy$$

where Hx is the transform of the magnetic field measurement parallel to the E field measurement, and Hy is the transform of the magnetic field measurement orthogonal to the E field. The impedance Zxy may be estimated from the recorded data and the defining equation by any one of a variety of techniques familiar to those skilled in the prior art of magnetotellurics.

In an alternative embodiment of this invention, the electrical field may also be measured in the direction at right angles to the survey line. In such a case another element of the impedance tensor designated Zxy and defined by the equation $$Ey = ZyxHx + ZyyHy$$

may also be estimated from the frequency components of the measured data.

It has been discovered as part of this invention that the function Zxy in three dimensional analysis behaves similarly to the E parallel impedance function in conventional two dimensional magnetotelluric analysis, except at large wave number values. In this invention the desirable qualities of the E parallel function are obtained in the case of three dimensional conductivity variation in the earth by attenuating the dependence of Zxy at large wave number values by low pass filtering with respect to wave number space.

It has further been discovered that a critical factor of the low pass filtering operation is the value of the cutoff wave number. It has been determined that, with respect to increasing values of wave number, Zxy and the 2-D E parallel function begin to differ appreciably at the value of the wave length equal to the depth of penetration of an electromagnetic wave into the earth, therefore the reciprocal of this value is an appropriate cutoff, although other values may be used within the scope of the invention.

It is well known in the art that, in the wave number and space domains, the linear operation that corresponds to low pass filtering is convolution with a kernel weighting function. The spatial length of the kernel function is reciprocal with the cutoff wave number so that the length of the kernel increases with decreasing wave number. In order to perform the weighting operation adequately at all wave numbers, it is therefore necessary to have enough spread of E field measurements at each point at which a conductivity sounding is to be obtained so that the longest kernel function required to spatially low pass filter the Zxy impedances can be accommodated. In the preferred embodiment, the simple cosine bell function may be used as the weighting kernel function.

The exact length of the cosine bell function to be used at any one frequency at any position along the survey line 16 is determined in the preferred embodiment by an iterative method. At each frequency and position to be examined an initial guess of a suitable length of the cosine bell function is made. The impedances are then weighted by that function and the sum of the impedances used to compute an apparent depth of penetration. The length of the cosine function is required to be a specified multiple of this depth of penetration. The length of the cosine bell is compared to the depth of penetration and the difference between the computed and specified multiple used to determine a new length for the cosine bell. This process is repeated until a suitable measure of convergence of the computed to the specified multiple is obtained. In practice this iterative procedure has been found to work well and converge rapidly.

When all the E field measurements over the entire survey path are made simultaneously, an alternative method of obtaining weighted impedances may be used. The weighting procedure, again using a cosine bell function of suitable length, is performed on the E field measurements transformed to the frequency domain, and those weighted measurements are then used in the impedance tensor to obtain weighted Zxy values.

Once the impedances have been spatially weighted at all frequencies of interest the functions are inverted to obtain estimates of conductivity versus depth along the survey path. The inversion procedures used in the preferred embodiment are those used in the prior art one dimension analysis. It would be possible to use more complicated procedures in cases where the increase in accuracy obtained by the use of such procedures justifies the considerable increase in computational effort required by their use.

The method by which the various computations are made is not part of the present invention, but it will be obvious to those skilled in the art that such computations may be conveniently made by use of a programmed digital electronic computer. Programs for performing the Fourier transforms, the cosine bell weighting function and the one dimension inversion procedure are all readily available.

The estimated conductivity at any point in a survey made according to the method of the present invention is a weighted average of the subsurface conductivities both directly beneath, and lateral of, the survey line. When the bulk of a conductive feature lies lateral of the survey line but is still evident in the cross section the section is said to be "side-swiped". According to published theoretical studies, the vertical component of the magnetic field at the point of the survey may be used to diagnose a side swipe. Therefore, in an alternative embodiment of this invention, the vertical component of the magnetic field is measured at the points along the survey path, and these measurements used according to the published methods of analysis to determine whether the cross sections determined by the method described above contain side swipes.

It is an advantage of the present invention that it permits use of a much simpler configuration of electric field sensors than was possible with the prior magnetotelluric survey methods. This will be of particular benefit in offshore surveying, and in surveying in very difficult terrain. Another advantage, which will be of benefit in the same situations, is that the magnetic field is measured in a much simpler manner. Only one magnetic sensor site is required, which in offshore surveying could be on shore, for surveys near the coastline, or positioned adjacent to a fixed offshore platform. Further, unlike conventional magnetotelluric methods, measurement of the vertical component of the magnetic field is not required to make the survey, although it may optionally be made to add information relating to structures lateral of the survey line.

Additional advantages and modifications will be readily apparent to those skilled in the art. The invention in its broader aspects is therefore not limited to the specific details, representative apparatus or the illustrative example shown and described. Accordingly, departures may be made from the detail without departing from the spirit or scope of the disclosed general inventive concept.

What is claimed is:

1. An electromagnetic geophysical survey method, comprising:
    measuring the variations in the earth's magnetic field in at least two horizontal non-parallel directions at at least one point in the survey area;
    simultaneously with the measurement of the variations of the magnetic field, measuring the variations in the earth's electrical field parallel to a survey line at a plurality of points along the survey line;
    transforming the measured variations in the magnetic field and electrical field into frequency components;
    calculating as a function of frequency the horizontal component of the earth's magnetic field orthogonal to the direction of the measured electrical field at each of the points from the measurements of the magnetic field in the two non-parallel directions;
    calculating as a function of frequency the impedance at each point, the impedance being ratio between the measured electrical field at that point and the horizontal component of the earth's magnetic field orthogonal to the direction of the measured electrical field;
    calculating for predetermined frequencies the weighted averages of the impedances such that the number of impedance entered into each weighted average increases with decreasing frequency in such a way that the number is substantially proportional to the effective depth of penetration into the earth of an electromagnetic wave of that frequency;
    calculating the distribution of conductivity in the earth below the survey line as a function of depth from the weighted averages of the impedances.

2. An electromagnetic geophysical survey method as described in claim 1, wherein the two directions in which the earth's magnetic field is measured are orthogonal to one another.

3. An electromagnetic geophysical survey method is described in claim 1, wherein the step of measuring the variations in the earth's electrical field parallel to the survey line consists of measuring the variations in the potential differences between one or more pairs of electrodes in electrical contact with the earth and spaced at substantially equal distances along the survey line and dividing the measured potential differences by the distance between the electrodes.

4. An electromagnetic geophysical survey method as described in claim 3, wherein the variations in the potential differences between all the electrodes are measured simultaneously.

5. An electromagnetic geophysical survey method is described in claim 3, wherein the variations in the potential differences between the members of a group of adjacent electrodes consisting of less than all the electrodes are measured simultaneously and and the measurements for each of the groups are made sequentially.

6. An electromagnetic geophysical survey method as described in claim 5, wherein at least one of the electrodes in one group is also a member of the adjacent group.

7. An electromagnetic geophysical survey method as described in claim 1, wherein the weighted averages of the impedances are calculated using a zero phase length weight function, the width of the weight function for each frequency being determined by selecting an appropriate width, obtaining a weighted average impedance using the selected function, using the weighted average so obtained to calculate an apparent depth of penetration, comparing the calculated depth of penetration to the expected depth of penetration, using the difference between the calculated and expected depths to assist in the selection of a more appropriate width, and repeating the process iteratively until a predetermined accuracy of calculation of the depth of penetration is obtained.

8. An electromagnetic geophysical survey method comprising:
    measuring the variations in the earth's magnetic field in at least two horizontal non-parallel directions at at least one point in the survey area;
    simultaneously with the measurement of the variation of the magnetic field, measuring the variations in the potential differences between adjacent electrodes in electrical contact with the earth, the electrodes being spaced at substantially equal intervals along a survey line and the measurements of the potential differences being made simultaneously;
    transforming the measured variations in the potential differences to a function of frequency;
    calculating for predetermined frequencies the weighted averages of the measured potential differences such that the number of potential differences entered into each weighted average increases with decreasing frequency in such a way that the number is substantially proportional to the effective depth of penetration into the earth of an electromagnetic wave of that frequency;
    calculating the horizontal component of the earth's magnetic field orthogonal to the direction of the survey line from the measurements of the magnetic field in the two non-parallel directions;

calculating weighted impedances along the survey line from the ratio of the weighted averages of the potential differences and the horizontal orthogonal component of the magnetic field;

calculating the distribution of conductivity of the earth below the survey line as a function of depth from the weighted impedances.

9. An electromagnetic geophysical survey method as described in claims 1 or 8, further comprising the steps of measuring the vertical component of the earth's magnetic field at a plurality of points along the survey line and using these measured vertical magnetic components together with the calculated distribution of conductivity of the earth below the survey line to determine the geophysical structure of the earth below the survey line.

* * * * *

UNITED STATES PATENT AND TRADEMARK OFFICE
CERTIFICATE OF CORRECTION

PATENT NO. : 4,591,791

DATED : May 27, 1986

INVENTOR(S) : Francis X. Bostick, Jr.

It is certified that error appears in the above-identified patent and that said Letters Patent is hereby corrected as shown below:

Column 10, line 8, delete "is" and insert --as--.

Column 10, line 21, delete "is" and insert --as--.

Signed and Sealed this

First Day of September, 1987

Attest:

DONALD J. QUIGG

Attesting Officer

Commissioner of Patents and Trademarks